Oct. 28, 1941.                K. KARISH                    2,261,031
                          WOODWORKING DEVICE
                         Filed Dec. 21, 1939
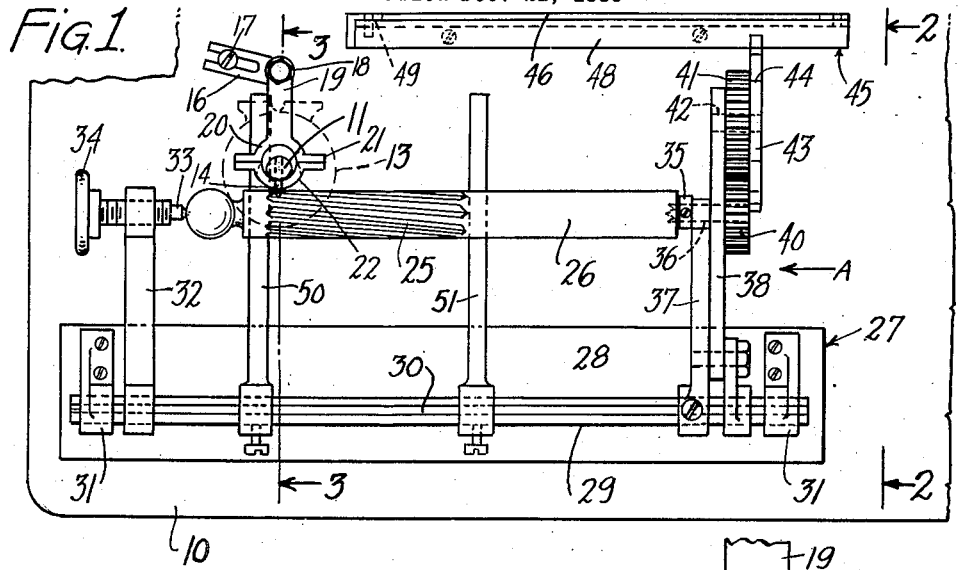
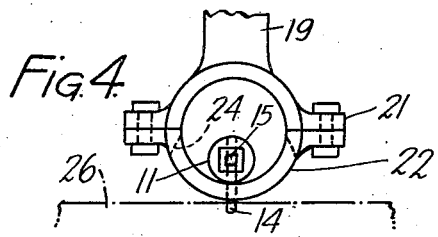
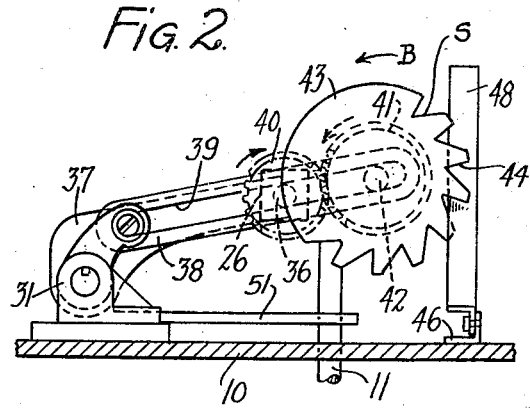
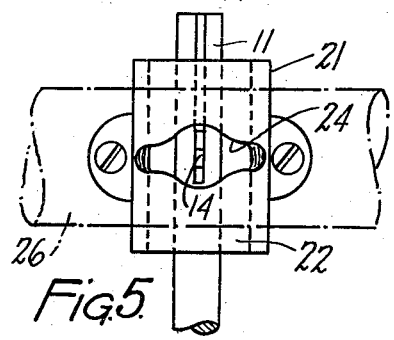
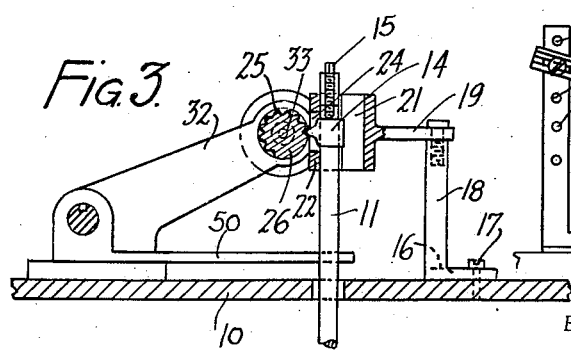
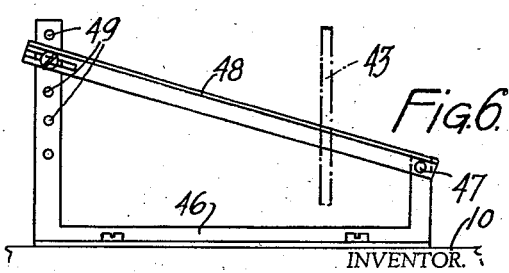
INVENTOR.
KARL KARISH
BY John J. Lynch
ATTORNEY.

Patented Oct. 28, 1941

2,261,031

UNITED STATES PATENT OFFICE 2,261,031

WOODWORKING DEVICE

Karl Karish, Brooklyn, N. Y.

Application December 21, 1939, Serial No. 310,315

4 Claims. (Cl. 142—26)

This invention relates to woodworking machines and in particular to a device employed in cutting spiral grooves or flutes in wood columns such for instance as in stair posts or newels.

A particular object of the invention is to provide a device in which the wood column to be ornamentally grooved may be placed for cutting, the device itself being adaptable for use in connection with any woodworking machine presenting a horizontal supporting table and a vertical power spindle. In the woodworking art, the use of special machinery has been necessary for the cutting of spiral or straight grooves and my invention contemplates the use of an attachment that can be employed with any standard flat top machine having a vertical power shaft to carry the cutter.

A still further object of the invention is the use of a device of the character referred to in which the parts are adjustable so that the pitch of the grooving may be closely controlled and so that columns of varying lengths may be grooved and so that the length of the groove can be adjusted.

Further objects are the provision of means that accomplish the foregoing with few parts which can be placed on the work table with a minimum of effort and adjustment, the parts being so arranged that the work can be quickly positioned in and removed from the holding device. To provide a device that can be stored when not in use so that the main machine can be used normally for its regular purpose and to provide a device that can be manipulated by unskilled labor to quickly turn out the work.

With the above and other objects in view, the invention consists in the novel combination, construction and arrangement of the parts as will be hereinafter set forth and illustrated in the accompanying drawing in which;

Figure 1 is a plan view of my attachment showing its position ready for use on a woodworking machine table, Figure 2 is a view in side elevation taken substantially on the line 2—2 of Figure 1, Figure 3 is a section taken on the line 3—3 of Figure 1 showing the power shaft, cutter and sleeve used in grooving the post.

Figure 4 is an enlarged plan view of the cutter shaft and sleeve thereon,

Figure 5 is a front view of said sleeve, and

Figure 6 is a front view of the cam frame employed.

Referring to the drawing in detail, 10 indicates the bed of any woodworking machine employing a vertical power shaft 11 driven by a motor 13 and extending above the surface of the table to carry a cutter 14 which is secured in the upper end of the shaft as by a screw 15 or other suitable medium. The cutter may be provided with a cutting edge of any desired contour in accordance with the cross sectional shape of flute wanted in the column of wood to be grooved. The cutter revolving at high speed will accordingly groove a wood member placed thereagainst and moved endwise. In order to provide a guide against which the post being grooved is slid, I use a foot 16 adjustably secured as at 17 to the table 10 carrying the upwardly extending arm 18 to which is attached the forwardly extending member 19 carrying at its outer end the semi-circular portion 20 of a sleeve guide 21, whose companion half circular portion 22 is suitably secured thereto and presents a cutter opening 24. This portion 22 is preferably formed of wood and can be replaced and being of wood is cut out by the cutter itself to give the minimum opening. It is understood that the column to be fluted or grooved will be pushed across the portion 22 of the guide and in being grooved will bear against said guide 21.

The wood column to be fluted or grooved as at 25 is indicated by the numeral 26 and is carried by the post carrier designated generally as at 27. This carrier 27 consists of a base 28 having mounted longitudinally thereof a shaft 29 presenting a keyway 30 and supported in the bearings 31. Mounted on the shaft 29 and extending beyond the base is a spindle carrier or bracket 32 in which is adjustably supported a centering spindle 33 actuated by a handwheel 34.

The column or post 26 is supported between the spindle 33 and a turning chuck 35 mounted on a gear stud shaft 36 supported in the outer end of a chuck bracket 37, the latter being mounted on shaft 29. The bracket 37 also carries a slotted gear holder 38, through the slot 39 of which extends the stud shaft 36, whose gear 40 engages a gear 41 mounted on a cam stud 42 which is journalled in the slot 39 and is adjustable relatively to shaft 29 so that various changes of gear combinations may be employed to vary the pitch of the spiral grooves being cut. The cam stud 42 carries a cam disk 43 whose serrated edge 44 engages a cam frame 45 to revolve the cam disk as the holder is moved in the direction of arrow A (Figure 1). The cam frame 45 includes a base 46 attached to the table or machine top 10 in any suitable manner and having hinged thereto as at 47, the inclined cam strip 48. The outer or free end of the cam strip is adjustable relatively to the horizontal by movement from one opening 49 in the vertical part of the frame to any other opening. The sharper the incline, the greater the degree of spiral or twist will be imparted to the grooving of the post. The shaft 29 also carries the stops 50 and 51 which limit the length of the grooving or fluting by engaging the power shaft 11 as the carrier 27 is reciprocated manually.

In the operation of the device, a post or column is placed between the centering spindle 33 and chuck 35 and the carrier is brought to a retracted position until stop 50 is against the shaft 11, with the post 26 bearing against the sleeve guide 21 and the first serration S of cam disk 43 engaging the edge of the cam strip 48. Now, as the carrier is pushed in the direction of arrow A (Figure 1), the cutter revolving at high speed will cut a groove and in spiral form due to the revolving movement of the post or column, imparted thereto by the gear operation, caused by the revolving movement of cam disk 43 in its travel along the cam strip 48. When the stop 51 engages the shaft 11 the groove has been completed and the carrier is retracted until the stop 50 engages shaft 11 and the cam disk is again moved into contact with the cam strip. In retracting the carrier, the cam is first disengaged from the cam strip so that the retractile movement will not affect the position of the post with respect to the cutter. The gear carrier is further supported from the shaft 29 by a bracket 53 attached thereto.

It is evident therefrom that I have provided a simple and efficient fluting device for cutting grooves or flutes in wood columns or posts and while the illustration has been confined to the use of a wood post, it is to be understood that the invention is capable of use in fluting metal bars or columns in like manner. I have also provided a device that is capable of use with any standard woodworking machinery table employing a vertical power spindle without changing the construction of the table and without detracting from its usefulness when the attachment for grooving is not in use.

My invention is not to be restricted to the precise details of construction shown since various changes and alterations therein may be made without departing from the spirit of the invention or sacrificing the advantages derived from its use.

What I claim is:

1. In a woodworking machine presenting a flat table top and a cutter shaft extending therethrough, the combination of a work carrier arranged for free manual sliding movement on the table top, a gauge on the table top adjustably associated with the cutter shaft and in contact with which the work is moved in cutting operation, means on the carrier engaging the cutter shaft for defining the movement of said carrier from start to finish of cutting operation, a cam strip mounted on said table top and means coacting with said cam strip for gradually turning the work during cutting operation.

2. In a woodworking machine of the character set forth in claim 1 in which the movement defining means of the carrier include relatively adjustable stops mounted on said carrier.

3. In a woodworking machine presenting a flat table top and a cutter shaft extending therethrough, the combination of a work carrier arranged for free manual sliding movement on the table top, a gauge on the table top adjustably associated with the cutter shaft and in contact with which the work is moved in cutting operation, means on the carrier engaging the cutter shaft for defining the movement of said carrier from start to finish of cutting operation, a cam strip mounted on said table top, said strip being adjustable from horizontal to inclined position, and means on the work carrier including a serrated cam disk coacting with said cam strip for gradually turning the work during cutting operation.

4. In a woodworking machine presenting a flat table top and a cutter shaft extending therethrough, the combination of a work carrier arranged for free manual sliding movement on the table top, said work carrier including a spindle for revolvably supporting one end of the work, a gauge on the table top adjustably associated with the cutter shaft and in contact with which the work is moved in cutting operation, relatively adjustable stops on the carrier engaging the cutter shaft for defining the movement of said carrier from start to finish of cutting operation, a cam strip mounted on said table top and adjustable from horizontal to inclined position, and a holder on said work carrier for changeable gears, a work turning chuck for revolvably supporting and driving the other end of the work, a cam disk and a gear train on said holder operatively connecting said cam disk with the chuck, and the cam disk coacting with said cam strip to turn the work through the gear train as the carrier moves in cutting operation.

KARL KARISH.